April 17, 1956   R. G. PIETY ET AL   2,741,917
FLOWMETER
Filed Oct. 13, 1952   4 Sheets-Sheet 1
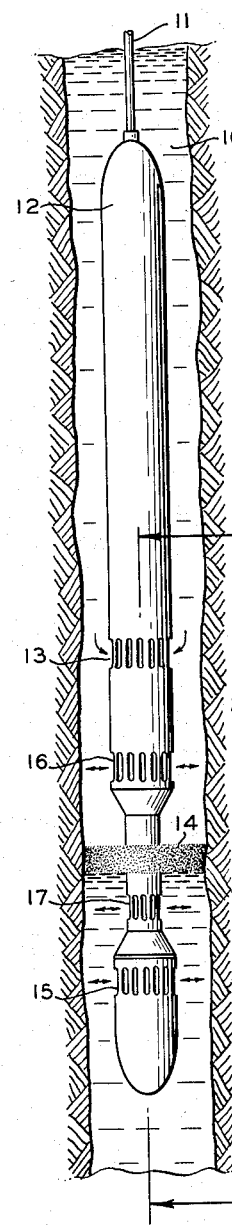
FIG.1
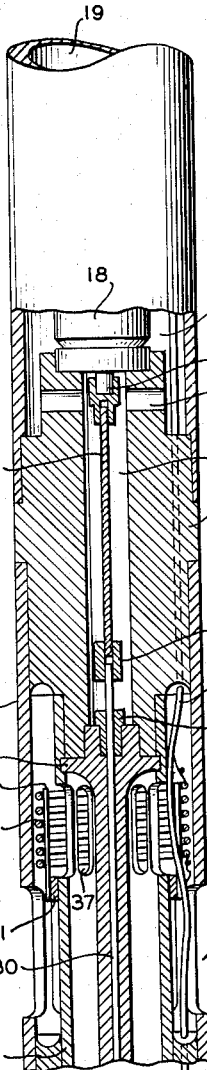
FIG.2a
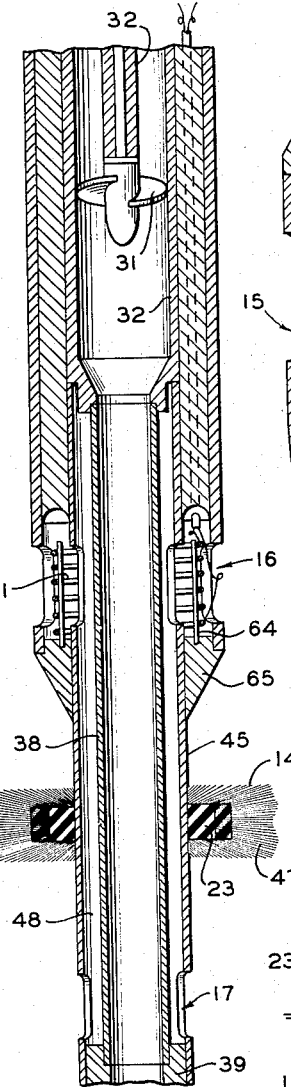
FIG.2b
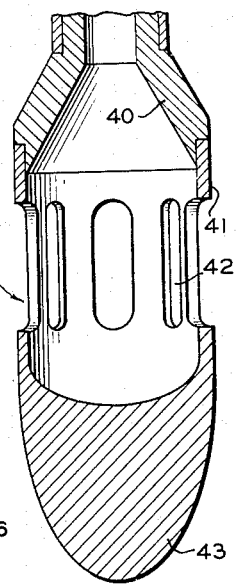
FIG.2c
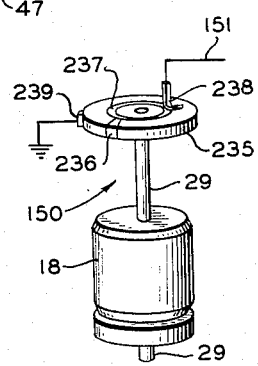
FIG.7
| FIG.2a |
| FIG.2b |
| FIG.2c |
FIG.8
INVENTORS
R.G. PIETY
B.F. WILEY
BY *Hudson & Young*
ATTORNEYS

FIG.3

April 17, 1956  R. G. PIETY ET AL  2,741,917
FLOWMETER
Filed Oct. 13, 1952  4 Sheets-Sheet 3

INVENTORS
R.G. PIETY
B.F. WILEY
BY
Hudson & Young
ATTORNEYS

April 17, 1956 R. G. PIETY ET AL 2,741,917
FLOWMETER
Filed Oct. 13, 1952 4 Sheets-Sheet 4

INVENTORS
R. G. PIETY
B. F. WILEY
BY
Hudson & Young
ATTORNEYS

United States Patent Office 2,741,917
Patented Apr. 17, 1956

2,741,917

FLOWMETER

Raymond G. Piety and Bruce F. Wiley, Bartlesville, Okla., assignors to Phillips Petroleum Company, a corporation of Delaware Application October 13, 1952, Serial No. 314,454

12 Claims. (Cl. 73—155)

This invention relates to flowmeters. In another aspect it relates to apparatus to measure fluid flow rates within boreholes. In another aspect it relates to apparatus for determining the rate fluid is injected from a borehole into adjacent formations. In still another aspect it relates to electrical circuitry for operating flowmeters disposed in inaccessible locations.

In certain petroleum operations it has been found desirable to inject fluids through a borehole into adjacent earth formations. This is particularly true in water flooding operations wherein water is pumped into a selected borehole so as to enter adjacent formations and force oil which may be deposited therein into an adjacent producing well. It is of course desirable to determine the rate fluid is injected into various sections of the borehole in order to control the rate oil is forced through the formations. The obvious method of measuring the rate of flow into the various formations is to position a conventional flowmeter at different depths within the borehole to measure the total flow therepast. However, this procedure requires a previous caliper measurement of the borehole diameter, and has not been found to be entirely satisfactory. For example, water may accumulate in cavities in the borehole which results in erroneous flow readings.

In accordance with the present invention there is provided a simplified flowmeter which eliminates the need for an absolutely fluid-tight packer. This flowmeter comprises a structure which is adapted to be positioned within the passage through which the flow is to be measured. A packing means extends outwardly from the structure to engage the walls of the passage to divide the passage into first and second regions. The structure supports first and second conduit means which communicate between the first and second regions of the passage. Means are associated with the first conduit means to indicate fluid flow therethrough. A rotatable impeller is positioned in the second conduit means and a motor is connected thereto to rotate the impeller at variable speeds. The impeller thus increases the flow through the second conduit means until there is a zero flow through the first conduit means. Under this condition it is known that the flow through the second conduit means represents the total flow through the passage. This flow is measured by apparatus which measures the speed of rotation of the impeller. The means associated with the first conduit means to indicate fluid flow preferably comprises a temperature sensitive resistance element connected in an electrical bridge circuit. The electrical bridge circuit and the motor circuit are connected to suitable surface indicating equipment by a plurality of electrical leads enclosed within a cable which also suspends the flowmeter within the borehole.

Accordingly, it is an object of this invention to provide apparatus to measure fluid flow.

Another object is to provide apparatus for determining at the surface of a borehole the rate of fluid flow from within the borehole into adjacent earth formations.

A further object is to provide a flowmeter adapted to be disposed in an inaccessible location together with indicating equipment positioned remotely from the inaccessible location.

A still further object is to provide apparatus for carrying out the above mentioned objects which is of rugged construction, simple to operate, and capable of giving accurate readings.

Various other objects, advantages and features of this invention should become apparent from the following detailed description taken in conjunction with the accompanying drawing in which:

Figure 1 illustrates water injectivity pumping and metering apparatus positioned within a borehole;

Figures 2a, 2b, and 2c, collectively, are vertical sectional views taken along line 2—2 in Figure 1;

Figure 3 is a schematic electrical circuit diagram of the components of the flowmeter assembly positioned both within the metering apparatus illustrated in Figure 1 and at the surface of the borehole;

Figure 7 is a view of the impeller speed indicator switch; and

Figure 8 illustrates the arrangement of parts in Figures 2a, 2b, and 2c.

Figure 4:
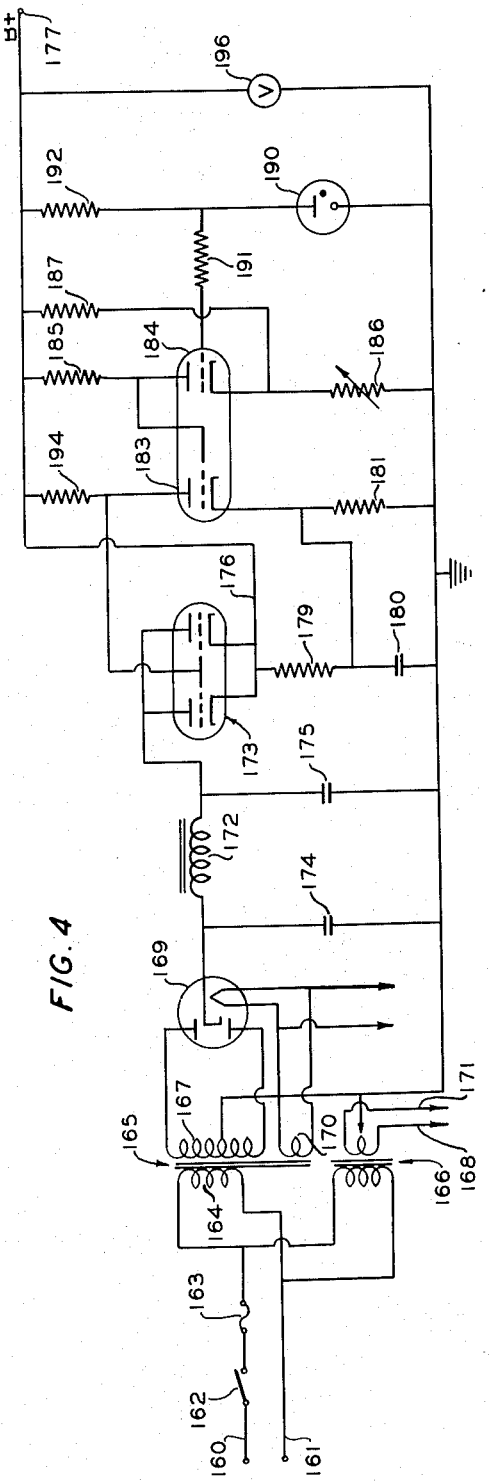
Figure 4 is a schematic electrical circuit diagram of the power supply equipment disposed at the surface of the borehole.

Suitable metering apparatus for use in water injectivity measuring operations is illustrated in Figure 1 of the drawing. This apparatus, which is supported within a section of a borehole 10 by a cable 11, includes a motor-pump assembly 12 which pumps fluid from an inlet 13 positioned above a packing device 14 to an outlet 15 below packing device 14. A second by-pass flow path is provided by an interior passage which communicates between an opening 16 above packing device 14 and an opening 17 below packing device 14. This last mentioned flow path has flow indicating means disposed therein to determine fluid flow therethrough. When water flows through outlet 15 at a rate equal to the rate at which it enters the adjacent earth formation below packer 14 there is no flow in either direction through the passage connecting openings 16 and 17 or past the flow indicating means associated with this passage. At this condition there is no tendency for fluid to flow past the packing means so that an absolutely fluid-tight packer is not needed. At this condition of no flow through the by-pass flow path the rate of flow through the passage connecting openings 13 and 15 is the rate at which water is being pumped into the earth formation below packer 14.

Figure 3:
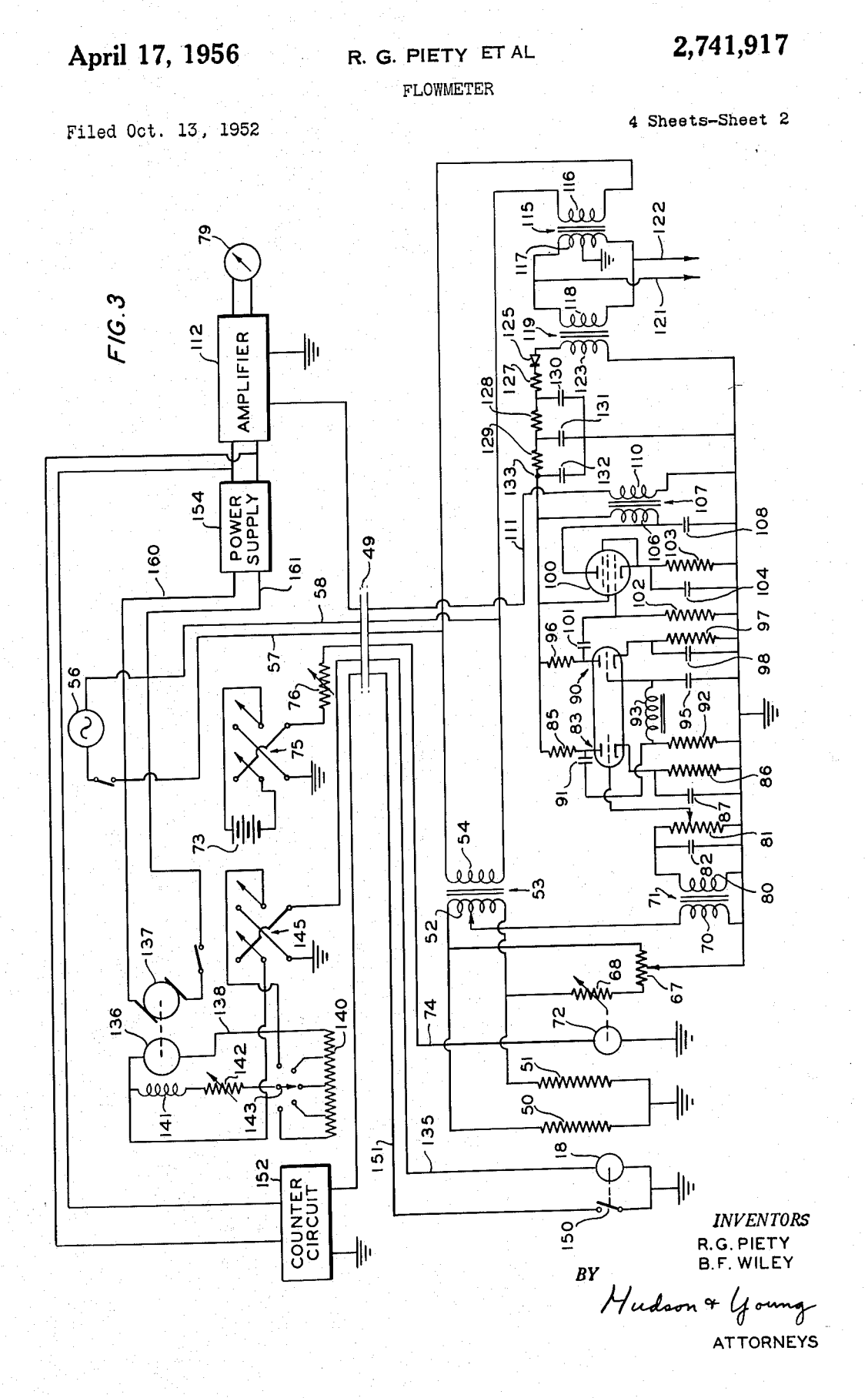

The detailed construction of the metering apparatus is shown in Figures 2a, 2b, and 2c. Motor-pump assembly 12 includes a motor 18 positioned at the upper end of an annular block 19. Motor 18 is operated from a source of electrical energy positioned at the surface of the borehole through suitable electrical leads illustrated in Figure 3 which are contained within cable 11. Motor 18 is disposed within a chamber 20 which preferably is filled with an insulating liquid such as oil.

An axial passage 26 in annular member 19 communicates with chamber 20 through a plurality of openings 27. Passage 26 contains a flexible rod coupling 28 which connects the drive shaft 29 of motor 18 to a rod 30 which supports a pump impeller 31 at the lower end thereof. Rod 30 is contained within a sleeve member 32 having an integral flanged head 33 abutting annular member 19 and carrying a bearing 34 for rod 30. Rods 28 and 30 are interconnected by a coupling device 35. Impeller 31 is housed within a tube 36 which is secured to annular member 19 at its upper end and which is provided with openings 37 forming a portion of inlet 13. The lower end of tube 36 is joined to a smaller diameter tube 38 which in turn is connected to a tubular member 39 having a flared lower portion 40 which receives an enlarged cylindrical discharge unit 41. Unit 41 is provided with openings 42 defining the outlet 15. Unit 41 also has an integral weighted member 43 which maintains the apparatus in vertical alignment within the borehole. Mounted concentrically with tube 38 is a larger tube 45 carrying a packing device 14 which may be made of any desired construction, but preferably is formed of an annular hard rubber sleeve 23 carrying a plurality of radially extending bristles 47 which engage the walls of the borehole in fluid tight arrangement. Bristles 47 are impregnated with a suitable sealing compound such as grease.

The metering apparatus thus far described is of substantially the same form as the flowmeter described in the copending application of R. G. Piety, Serial No. 159,264, filed May 1, 1950. The present invention does not reside in this metering apparatus per se but rather in the particular flow indicating means and electrical circuitry associated therewith which is adapted to measure the flow through a passage 48 which communicates between openings 16 and 17 as previously described.

The various electrical circuit elements associated with the flow measuring device of this invention are illustrated schematically in Figure 3. Those elements disposed above broken line 49 are positioned at the surface of the borehole and those elements disposed below line 49 are contained within a chamber 19 of the flowmeter unit suspended in the borehole.

The flow indicating apparatus consists essentially of a bridge circuit having like thermal sensitive resistance elements 50 and 51 connected in series relationship with the secondary winding 52 of a transformer 53. The primary winding 54 of transformer 53 is connected to an alternating current voltage source 56 by electrical leads 57 and 58. Both resistance elements 50 and 51 are housed within the pumping apparatus illustrated in Figures 2a and 2b, respectively. Resistance element 50 is shaped in the form of a helix and mounted adjacent opening 13 on a plurality of spaced support rods 60 which in turn are secured to an annular member 61 interposed between cylindrical member 36 and casing 22. Resistance element 51 is mounted in like manner adjacent opening 16 on a plurality of spaced support rods 64 secured to an annular member 65. The interconnected end terminals of resistors 50 and 51 are maintained at ground potential, preferably by connection to the metallic cable 11 which encloses the electrical leads extending to the surface equipment. A potentiometer 67 and a variable resistor 68 also are connected in series relationship with secondary winding 52 of transformer 53. The contactor of potentiometer 67 is maintained at ground potential and a center tap on transformer winding 52 is connected to ground through the primary winding 70 of a transformer 71. A reversible direct current motor 72 is associated with resistor 68 whereby the rotation of motor 72 adjusts the ohmic resistance of resistor 68. Motor 72, one terminal of which is grounded, is connected to a source of direct current operating potential 73 by a lead 74 and a double pole double throw reversing switch 75. A variable resistor 76 is connected in lead 74 to adjust the voltage applied to motor 72.

Resistors 50, 51, and 68 and potentiometer 67 thus form an electrical bridge circuit having an alternating voltage applied across opposite terminals thereof through transformer 53. Once the flow measuring apparatus is suspended within the borehole the bridge circuit is balanced initially by adjustment of resistor 68 through rotation of motor 72 in either direction as is required to establish a condition of electrical balance. As is more fully described hereinafter, the balance of the bridge circuit is indicated by the reading on meter 79 which measures the amplified potential difference between the contactor of potentiometer 67 and the center tap of transformer winding 52. The initial condition of balance is obtained by disposing the flowmeter within the borehole fluids before the actual injectivity pumping is started. Under this condition the temperatures of resistance elements 50 and 51 are equal.

As long as equal quantities of fluid pass elements 50 and 51 the bridge circuit will remain in a condition of electrical balance, that is, there being no potential difference between the contactor of potentiometer 67 and the center tap of transformer winding 52. However, should the rate of flow past either of these elements deviate from the rate of flow past the other element, then that element disposed in the path of greater flow will be cooled more than the other element, thereby resulting in electrical unbalance of the bridge circuit. This unbalance condition results in a flow of current through the primary winding 70 of transformer 71 which in turn is indicated on meter 79 after amplification by means of the electrical circuitry hereinafter described.

The secondary winding 80 of transformer 71 is connected across the end terminals of a potentiometer 81, which potentiometer is shunted by a capacitor 82. The contactor of potentiometer 81 is connected to the control grid of a triode 83 forming the first stage of a two-stage resistance-capacitance coupled amplifier. The anode of triode 83 is connected to a source of positive potential at terminal 133 through a resistor 85 and the cathode of triode 83 is grounded through a bias resistor 86 shunted by a capacitor 87. The output signal from triode 83 is applied to the input of a second triode 90 through a filter adapted to eliminate any harmonics of voltage source 56 which may be present in the amplified signal. The anode of triode 83 is connected to ground through a capacitor 91 and a resistor 92 connected in series. The junction between capacitor 91 and resistor 92 is connected to the control grid of triode 90 through an inductor 93. The control grid of triode 90 is connected to ground through a capacitor 95; the anode of triode 90 is connected to positive potential terminal 133 through a resistor 96; and the cathode of triode 90 is grounded through a bias resistor 97 shunted by a capacitor 98. The output signal from triode 90 is applied to the control grid of a pentode 100 through a capacitor 101. The control grid of pentode 100 is connected to ground through a resistor 102; the screen grid of pentode 100 is connected directly to a positive potential terminal 133; and both the suppressor grid and cathode of pentode 100 are connected to ground through a bias resistor 103 shunted by a capacitor 104. The anode of pentode 100 is connected to positive potential terminal 133 through the primary winding 106 of an output transformer 107. A capacitor 108 is connected between ground and that terminal of winding 106 which is connected directly to the anode of pentode 100. One terminal of the secondary winding 110 of transformer 107 is grounded and the second terminal of winding 110 is connected by a lead 111 to one input terminal of an amplifier 112 positioned at the surface of the borehole. The output terminals of amplifier 112 are connected to meter 79.

The operating potentials for the three vacuum tubes previously mentioned are supplied by means of a suitable transformer-rectifier-filter circuit carried within the apparatus suspended in the borehole. This circuit comprises a first transformer 115 having its primary winding 116 connected across the source of alternating voltage 56. The secondary winding 117 of transformer 115 has a grounded center tap and the end terminals thereof are connected across the primary winding 118 of a second transformer 119. Electrical leads 121 and 122 are connected to the two end terminals of winding 117 to supply heating current to the filaments (not shown) of tubes 83, 90 and 100. One end terminal of the secondary winding 123 of transformer 119 is grounded and the second end terminal of winding 123 is connected to a first terminal of a rectifier 125. The second terminal of rectifier 125 is connected to the input of a filter which comprises series connected resistors 127, 128 and 129, a first capacitor 130 connected between ground and the junction between resistors 127 and 128, a second capacitor 131 connected between ground and the junction between resistors 128 and 129, and a third capacitor 132 connected between ground and the output terminal 133 of the filter unit. The potential at terminal 133, taken with respect to ground, is the previously mentioned source of positive potential.

Motor 18, which drives impeller 31, is connected to a source of direct potential located at the surface by a lead 135 and ground. This direct potential is supplied by a generator 136 which is rotated by a motor 137 operated from voltage source 56. One output terminal of generator 136 is connected by a lead 138 to a first end terminal of a potential dividing rheostat 140. The second end terminal of generator 136 is connected through the field winding coil 141 of generator 136 and a variable resistor 142, connected in series therewith, to a switch 143 which forms the variable contactor of potential divider 140. The output voltage from generator 136 is thus applied to the center terminals of a double pole double throw reversing switch 145. The magnitude of this output voltage is adjusted by potential divider 140. Conductor 135 is connected to switch 145 such that either a positive or negative potential can be applied to the first terminal of motor 18, the second terminal of which is grounded.

A switch 150, which is described in greater detail hereinafter in conjunction with Figure 7, is associated with motor 18 whereby switch 150 is momentarily opened once during each revolution of motor 118. One terminal of switch 150 is grounded and the second terminal thereof is connected by a lead 151 to an input terminal of a counter circuit 152. Counter circuit 152 is adapted to provide a measurement of the speed of rotation of motor 18 by means of a count of the number of times switch 150 is opened per unit time interval.

A power supply circuit 154 is connected across voltage source 56 to provide regulated output voltages to operate the various vacuum tubes contained within amplifier 112 and counter circuit 152. Power supply 154, amplifier 112 and counter circuit 152 are described in detail hereinafter.

Power supply circuit 154 is illustrated in Figure 4. Alternating voltage from source 56 (Figure 3) is applied through leads 160 and 161, a switch 162 and a fuse 163 to the primary winding 164 of a transformer 165. The end terminals of the secondary winding 167 of transformer 165 are connected respectively to the two anodes of a full wave rectifying tube 169. A second secondary winding 170 on transformer 165 supplies heating current for the filament of tube 169 and for the filaments (not shown) of the other vacuum tubes illustrated in Figure 4. The cathode of tube 169 is connected through an inductor filter 172 to the two anodes of a double triode tube 173. A pair of capacitors 174 and 175 are connected between ground and the respective two end terminals of inductor 172. The two cathodes of tube 173 are connected by a lead 176 to an output terminal 177 which forms the positive B+ voltage terminal for amplifier 112 and counter circuit 152. This B+ voltage supply is taken between terminal 177 and ground. The two cathodes of tube 173 also are connected to ground through a resistor 179 and a capacitor 180 connected in series. The junction between resistor 179 and capacitor 180 is connected to ground through a resistor 181 and to the cathode of a triode 183. Triode 183 and a second triode 184 are provided to regulate the output voltage between terminal 177 and ground. The anode of triode 184 is connected to terminal 177 through a resistor 185 and the cathode of triode 184 is connected to ground through a variable bias resistor 186. A voltage regulating tube 190 of the cold cathode glow discharge type has its cathode connected to ground and its anode connected to the control grid of triode 184 through a resistor 191. A resistor 192 is connected between terminal 177 and the junction between tube 190 and resistor 191. The anode of triode 184 is connected directly to the control grid of triode 183. The anode of triode 183 is connected to terminal 177 through a resistor 194 and directly to the two control grids of double triode tube 173. The cathode of triode 184 is grounded through bias resistor 181. A voltmeter 196 is connected between terminal 177 and ground to indicate the output voltage. A second transformer 166 has its primary winding connected across voltage leads 160 and 161. The end terminals of the secondary winding of transformer 166 are connected to respective leads 168 and 171 to form a filament supply voltage for the various vacuum tubes in amplifier 112 and counter circuit 152.

The operation of this power supply circuit should readily be apparent to those skilled in the art. Voltage regulating tube 190 supplies a fixed reference voltage between the control grid of triode 184 and ground. Any change in the voltage appearing between terminal 177 and ground is amplified by triodes 184 and 183 which are connected as a two-stage direct current amplifier, such that the output of triode 183 controls the voltage drop across double triode 173 to maintain a constant output voltage between terminal 177 and ground. Resistor 185 has a high ohmic value in comparison with resistor 187, 470,000 ohms and 15,000 ohms being illustrative values. If, for example, the voltage between terminal 177 and ground tends to decrease, the voltage on the cathode of triode 184 is lowered which results in increased current flow through triode 183 such as to lower the potential on the anode thereof. This in turn lowers the potential on the control grid of triode 184 which results in an increase in potential on the anode thereof. This increased potential is applied directly to the two control grids of double triode 173 which results in increased conduction through the two triodes. This increased conduction through the triodes 173 increases the potential on the cathodes thereof so as to maintain the potential between terminal 177 and ground at the desired value. If, on the other hand, the potential between terminal 177 and ground tends to increase, the action of tubes 183, 184, and 173 is reversed to decrease the output voltage between terminal 177 and ground to the desired value.

Figure 5:
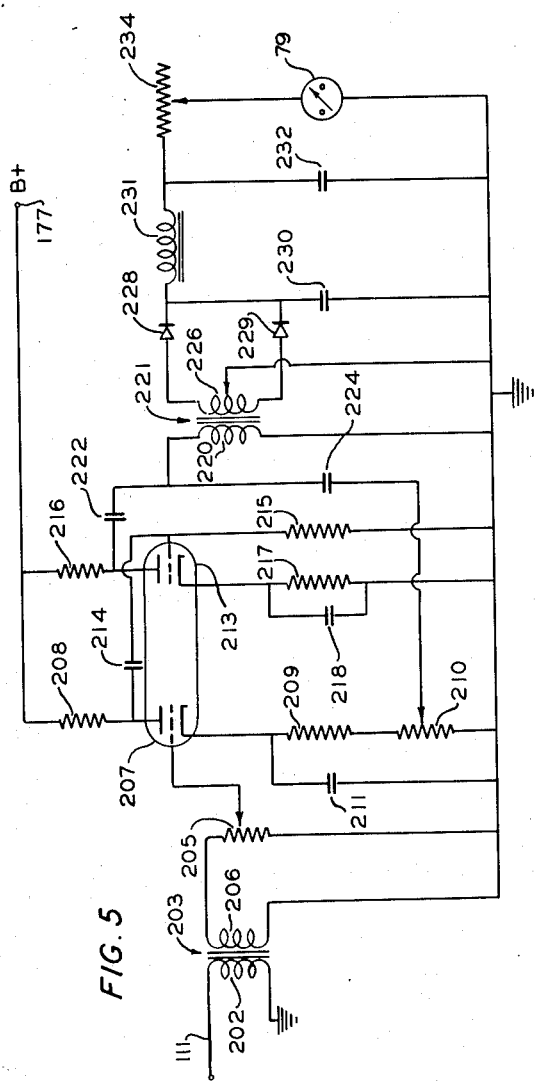
Figure 5 is a schematic electrical circuit diagram of the amplifier disposed at the surface of the borehole.

Amplifier 112 is illustrated in Figure 5. Lead 111 is connected to one end terminal of the primary winding 202 of a transformer 203, the second end terminal of which is grounded. A potentiometer 205 is connected in parallel with the secondary winding 206 of transformer 203 and the contactor in potentiometer 205 is connected to the control grid of a triode 207. The anode of triode 207 is connected to the source of positive potential at terminal 177 through a resistor 208, and the cathode of triode 207 is grounded through a resistor 209 and a potentiometer 210 connected in series. A capacitor 211 is shunted across series connected resistor 209 and potentiometer 210. The anode of triode 207 is connected to the control grid of a second triode 213 through a capacitor 214. The control grid of triode 213 is grounded through a resistor 215; the anode of triode 213 is connected to potential terminal 177 through a resistor 216; and the cathode of triode 213 is grounded through a bias resistor 217 shunted by a capacitor 218. The anode of triode 213 is connected to one end terminal of the primary winding 220 of a transformer 221 through a capacitor 222. The second end terminal of winding 220 is grounded. The junction between winding 220 and capacitor 222 is connected to the contactor of potentiometer 210 through a capacitor 224. This last mentioned connection provides a degenerative feedback path between the anode of triode 213 and the cathode of triode 207. The center tap of the secondary winding 226 of transformer 221 is maintained at ground potential and the two end terminals of winding 226 are connected to first end terminals of respective rectifiers 228 and 229. The second end terminals of rectifiers 228 and 229 are joined together and connected to ground through a capacitor 230 and to a first terminal of an inductor filter 231. The second terminal of inductive 231 is connected to ground through a capacitor 232 and to one end terminal of a potentiometer 234. Current indicating meter 79 is connected between the contactor of potentiometer 234 and ground to measure the rectified output signal from the two-stage resistance-capacitance coupled amplifier 112. Current indicating meter 79 preferably is a micro-ammeter.

As previously mentioned, counter circuit 152 is employed to measure the speed of rotation of motor 18 which closes switch 150 momentarily once during each complete rotation thereof. Switch 150 is illustrated in detail in Figure 7. A rotatable disk 235 is fixed to the upper end of drive shaft 29 of motor 18. Disk 235 is constructed of electrical insulating material, but is provided with a sector 236 of electrical conductive material. Sector 236 is connected to a ring 237 of electrical conductive material which is disposed on the upper surface of disk 235 in continuous contact with a brush 238. Lead 151 is connected to brush 238. A second brush 239 makes continuous contact with the periphery of disk 235 such as to make contact with sector 236 once during each rotation of disk 236. Brush 239 is connected to ground. Thus lead 151 is connected to ground momentarily once during each revolution of motor 18.

Figure 6:
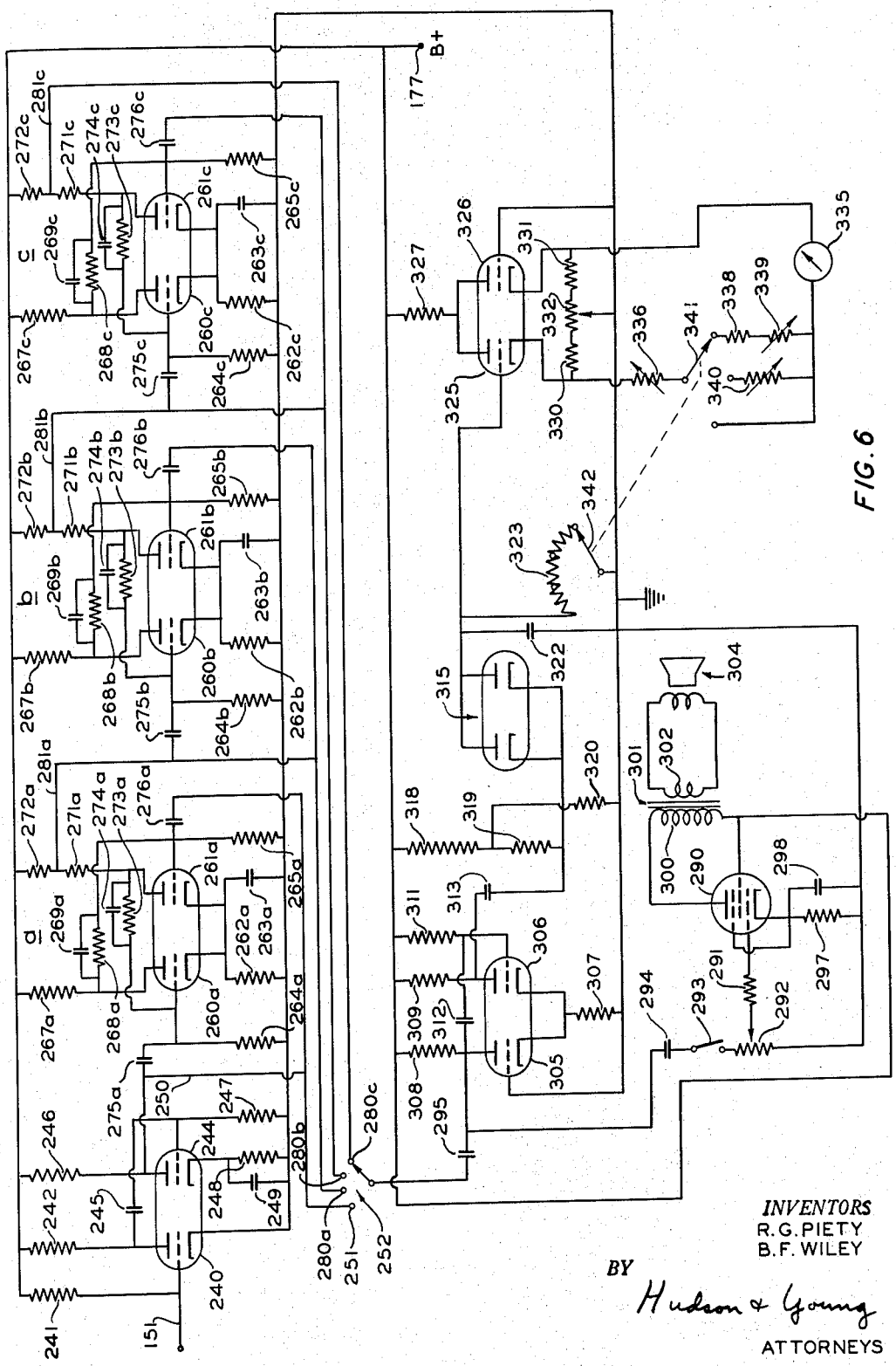
Figure 6 is a schematic electrical circuit diagram of the counter circuit disposed at the surface of the borehole.

A lead 151 is connected between switch 150 and the control grid of a triode 240 which is illustrated in Figure 6. The control grid of triode 240 is connected to positive potential terminal 177 through a resistor 241. The anode of triode 240 is connected to positive potential terminal 177 through a resistor 242, and the cathode of triode 240 is connected directly to ground. The anode of triode 240 also is connected to the control grid of a triode 244 through a capacitor 245. The anode of triode 244 is connected to positive potential terminal 177 through a resistor 246; the control grid of triode 244 is grounded through a resistor 247; and the cathode of triode 244 is grounded through a bias resistor 248 shunted by a capacitor 249. The anode of triode 244 is connected by a lead 250 to a first terminal 251 of a selector switch 252. Triode 240 normally is conducting because of the positive potential applied to its control grid through resistor 241. However, each time switch 150 is closed the control grid of triode 240 is grounded momentarily which results in an increase in potential on the anode thereof. This increased potential is in turn applied to the control grid of triode 244 which results in a reduction in potential on the anode thereof. The net result is an amplified negative pulse being applied to terminal 251 each time switch 150 is closed by rotation of motor 18.

A frequency divider counting circuit is connected to the output signal from triode 244 to facilitate counting the pulses generated by switch 150 during relatively high speed operation of motor 18. This frequency division is accomplished by three identical Eccles-Jordan trigger circuits designated by the reference letters $a$, $b$, and $c$. In order to simplify the description of this pulse divider circuit, only the $a$ trigger circuit will be described in detail, it being understood that the $b$ and $c$ circuits are constructed and operate in like manner.

The $a$ counting circuit comprises a pair of identical triodes 260a and 261a having their cathodes grounded through a common bias resistor 262a shunted by a capacitor 263a. The control grids of triodes 260a and 261a are grounded through respective resistors 264a and 265a. The anode of triode 260a is connected to positive potential terminal 177 through a resistor 267a and to the control grid of triode 261a through a resistor 268a shunted by a capacitor 269a. The anode of triode 261a is connected to positive potential terminal 177 through series connected resistors 271a and 272a and to the control grid of triode 260a through a resistor 273a shunted by a capacitor 274a. The anode of triode 244 is connected to the control grid of triode 260a through a capacitor 275a and to the control grid of triode 261a through a capacitor 276a.

As is well known to those skilled in the art, the trigger circuit thus far described is arranged whereby the anode of one triode controls the control grid of the second and vice versa. This results in only one tube conducting at any given time. For purposes of discussion, it will arbitrarily be assumed that triode 260a is conducting initially. The negative output pulse from the anode of triode 244 is applied simultaneously to the control grids of triodes 260a and 261a. Because triode 261a already is non-conducting, this negative pulse applied to the grid thereof does not affect the operation of the tube. The negative pulse being applied to the control grid of triode 260a, however, tends to decrease the conduction of triode 260a, thereby increasing the potential on the anode thereof. This increased anode potential is applied to the control grid of triode 261a to cause the latter triode to become conducting. This in turn decreases the potential on the anode of triode 261a, which decreased potential is applied back to the control grid of triode 260a to further decrease the conduction therethrough. Such potential transfer is continuous until triode 261a is conducting and triode 260a is cut off. The two triodes then remain in this latter condition until a second pulse from triode 244 is applied to the two control grids thereof. The second pulse reverses the previous operation of the two tubes to restore triode 260a to its initial condition of conduction and triode 261a to cut off. Thus it can be seen that two negative pulses are required to complete the cycle of operation of the $a$ trigger circuit.

The output signal from the $a$ circuit is applied to terminal 280a of switch 252 by a lead 281a connected to the junction between resistors 271a and 272a. Accordingly, a single negative pulse is applied to terminal 280 for each two negative pulses applied to terminal 251. The output negative pulse applied to terminal 280 also is applied to the two control grids of the $b$ trigger circuit through respective capacitors 275b and 276b. The output signal from the $b$ circuit is applied to terminal 280b of switch 252 by a lead 281b and to the two control grids of the $c$ trigger circuit through respective capacitors 275c and 276c. The output signal from the $c$ counter circuit is applied to terminal 280c of switch 252. Thus by movement of the contactor of switch 252 through terminals 251, 280a, 280b and 280c, pulses are obtained which represent, respectively, the number of pulses generated by switch 150 per unit time, one-half of such pulses, one-fourth of such pulses and one-eighth of such pulses.

The actual number of pulses transmitted through switch 252 can be indicated by either of two electrical circuits connected to the contactor of switch 252. The first of these counter circuits comprises a pentode power tube 290 having its control grid connected to the contactor of switch 252 through a resistor 291, a potentiometer 292, a switch 293 and a pair of capacitors 294 and 295, all connected in series. The cathode and suppressor grid of pentode 290 are grounded through a bias resistor 297 shunted by a capacitor 298. The anode of pentode 290 is connected to positive potential terminal 177 through the primary winding 300 of an output transformer 301. The screen grid of pentode 290 is connected directly to positive potential terminal 177. The end terminals of the secondary winding 302 of transformer 301 are connected to a speaker unit 304 which provides an audible buzzing signal indicating the frequency of pulses applied to the control grid of triode 290. An arrangement of this sort obviously does not give an exact measurement of the speed of rotation of motor 18 except for very slow speeds, but an approximation can readily be obtained of the motor speed.

In order to provide a quantitative measure of the speed of rotation of motor 18, a second measuring circuit is employed. This circuit includes a one-shot multivibrator adapted to provide a uniform shaped pulse for each input negative pulse applied thereto, a rectifier, an integrating circuit, and an output meter.

The multivibrator includes a pair of triodes 305 and 306 having their cathodes grounded through a common resistor 307. The anodes of triodes 306 and 307 are connected to positive potential terminal 177 through respective resistors 308 and 309. The control grid of triode 305 is connected directly to ground, and the control grid of triode 306 is connected to positive potential terminal 177 through a resistor 311. The contactor of switch 252 is connected to the anode of triode 305 through a capacitor 295, and the anode of triode 305 is connected to the control grid of triode 306 through a capacitor 312. The anode of triode 306 is connected through a capacitor 313 to the two cathodes of a double rectifier tube 315. A pair of series connected resistors 318 and 319 is connected between positive potential terminal 177 and the cathodes of tube 315. A resistor 320 is connected between ground and the junction between resistors 318 and 319. The two anodes of tube 315 are connected together and to ground through a capacitor 322 shunted by a variable resistor 323. The anodes of tube 315 also are connected to the control grid of a triode 325. The anode of triode 325 is connected to the anode of a second triode 326 and to positive potential terminal 177 through a resistor 327. The control grid of triode 326 is connected directly to ground. The cathode of triode 325 is connected to the cathode of triode 326 through a voltage dividing network comprising a resistor 330, a potentiometer 332 and a resistor 331. The contactor of potentiometer 332 is connected to ground. The voltage dividing network including resistors 330 and 331 and potentiometer 332 is shunted by a series connected second network including a current measuring meter 335 and a variable resistor 336 which is selectively connected in series with either a pair of resistors 338 and 339, a single resistor 340, or directly to meter 335 through a switch 341. Switch 341 is mechanically connected to the contactor 342 of variable resistor 323 which varies the resistance which is connected between the anodes of tube 315 and ground. Thus the larger the resistance of variable resistor 323 in shunt with capacitor 322, the larger the resistance in series with resistor 336 and meter 335.

Circuit component values which have been found to give satisfactory results in the circuit of Figure 6 are as follows: resistors 308 and 309, each 50,000 ohms; resistor 311, 10,000,000 ohms; resistor 307, 6,800 ohms; resistor 318, 100,000 ohms; resistor 319, 18,000 ohms; resistor 320, 2,500 ohms; resistor 327, 30,000 ohms; resistors 330 and 331, each 2,800 ohms; potentiometer 332, 1,000 ohms; resistor 336, 2,000 ohms; resistors 339 and 340, each 5,000 ohms; resistor 338, 2,200 ohms, resistor 323, the sectors from left to right, respectively, 3,000,000 ohms, 2,000,000 ohms, and the 5,000,000 ohms; capacitors 295, 312 and 313, each .005 microfarads; capacitor 322, 1 microfarad; tubes 305, 306 and 325, 326, 12AU7; and tube 315, 6AL5.

The operation of this last mentioned counting circuit can be explained in the following manner. The voltage dividing network including resistors 318, 319 and 320 is proportioned to maintain a sufficient positive potential on the cathodes of tube 315 to prevent any conduction therethrough under normal conditions. The negative pulses applied through switch 252, however, serve to reduce the potential on the cathodes of 315 by a sufficient amount that conduction will take place for a short time interval following each applied pulse. The one-shot multivibrator is employed to shape the input pulses to provide a pulse of constant magnitude irregardless of the magnitude of the pulse applied through switch 252. Triode 306 normally is conducting while triode 305 is maintained at cut-off. The negative pulse applied through capacitors 295 and 312 lowers the potential on the control grid of triode 306 which decreases the current flow therethrough. This in turn lowers the potential on the cathodes of triodes 305 and 306 which allows triode 305 to become conducting, thereby lowering the potential on the anode thereof and further lowering the potential on the control grid of triode 306. This results in triode 306 becoming non-conducting. This condition is unstable, however, because the control grid of triode 306 is connected to positive potential terminal 177 through a high resistor 311 while the control grid of triode 305 is directly connected to ground. Immediately following the negative pulse being applied to the control grid of triode 306, condenser 312 is recharged through resistor 311 which causes triode 306 to become conducting once again and returns triode 305 to its original non-conducting condition. As triode 306 becomes conducting the potential on its anode is lowered. This results in a negative pulse being applied to the cathodes of tube 315 through capacitor 313 which enables tube 315 to conduct until stability is restored to the multivibrator circuit. Once stability is restored tube 315 becomes non-conducting because of the positive potential maintained on the cathodes thereof through resistors 318, 319 and 320. The negative pulse applied to the cathodes of tube 315 is of constant duration and magnitude. The output pulse from tube 315 resulting from conduction therethrough charges condenser 322 which forms an integrating circuit with resistor 323.

Triodes 325 and 326 and the resistors associated therewith form a bridge circuit comprising a vacuum tube voltmeter, the output signal of which is read on meter 335. The negative pulses transmitted through rectifier 315 are in effect applied to the control grid of triode 325 to reduce the current flow therethrough. This in turn creates an unbalance of the voltmeter bridge circuit which is indicated on meter 335. The time constant of the integrating circuit is adjusted by contactor 342 of resistor 323. This contactor is coupled to switch 341 whereby the resistance connected in series with meter 335 is increased in proportion to the increased time constant by movement of switch 342 along resistor 323. Thus, a steady reading is obtained on meter 335 which represents the pulses produced per unit time by rotation of motor 18. The readings of meter 335 are calibrated in terms of the volume of fluid passing impeller 31 per unit time.

The overall operation of the flow measuring device of this invention should now become apparent. Motor 18 is operated to rotate impeller 31 in the first flow path from inlet 13 through tubes 36, 38 and 39 to discharge outlet 15. In this regard it should be noted that the fluid flow through the foregoing path is established primarily by the pressure on the fluid in region 10, which is created by suitable pumping apparatus, not shown, positioned at the surface of the bore hole, rather than by operation of impeller 31. Impeller 31 is rotated with the flow of water for the purpose of giving an indication of the rate water is passing thereby. The second by-pass flow path is provided through inlet 16, past bridge resistor 51, through opening 48, and finally out opening 17, or in the reverse direction. Under conditions of zero flow through the by-pass path the downhole electrical bridge circuit including resistors 50 and 51 is at a condition of maximum unbalance. However, any flow past resistance element 51 cools this element to reduce the degree of bridge unbalance; and this, in turn is indicative of the rate of fluid flow therepast. When water flows past impeller 31 at the same rate it is entering the earth formations below packer 14, the flow through by-pass channel 48 will be zero as indicated by maximum unbalance of the bridge circuit. At this condition the speed of impeller 18 is determined by meter 333 which is calibrated to read the rate water is being pumped into the selected earth formations. A zero flow through by-pass channel 48 obviously indicates there is no pressure drop across packer 14 and hence no leakage through this packer. Impeller 31 merely adds sufficient energy to the fluid flow therepast to eliminate any pressure drop between openings 13 and 15.

While the flow measuring system of the present invention has been described in conjunction with particular metering apparatus for use in water injection operations it should be apparent that the invention is in no way limited to such an application. For example, the flow through any two parallel paths can be compared or the total flow through one path can be measured by this flowmeter. The particular circuit components should be considered by way of illustration and not as limiting the invention thereto.

What is claimed is:

1. Apparatus to measure fluid flow through a passage comprising a structure adapted to be positioned within the passage, packing means extending outwardly from said structure to engage the walls of the passage to divide the passage into first and second regions, first conduit means carried by said structure to communicate between said first and second regions, second conduit means carried by said structure to communicate between said first and second regions, means positioned in said first conduit means to indicate fluid flow through said first conduit means, a rotatable impeller positioned in said second conduit means, means to rotate said impeller at variable speeds, switching means coupled to said impeller so that rotation of said impeller opens and closes said switching means, an electrical circuit including said switching means, a voltage source applied across said circuit, a pulse generating circuit connected to said first-mentioned circuit so that electrical pulses in said first-mentioned circuit energize said pulse generating circuit, a voltage integrating circuit connected to the output of said pulse generating circuit, and means to measure the output of said integrating circuit which is respresentative of the ferquency of opening and closing of said switching means, said frequency being representative of the rate of fluid flow between said regions when the indicated flow through said first conduit means is zero.

2. Apparatus to measure fluid flow through a passage comprising a structure adapted to be positioned within the passage, packing means extending outwardly from said structure to engage the walls of the passage to divide the passage into first and second regions, first conduit means carried by said structure to communicate between said first and second regions, second conduit means carried by said structure to communicate between said first and second regions, means positioned in said first conduit means to indicate fluid flow through said first conduit means, a rotatable impeller positioned in said second conduit means, means to rotate said impeller at variable speeds, switching means coupled to said impeller so that rotation of said impeller opens and closes said switching means, an electrical circuit including said switching means, a voltage source applied across said circuit, an amplifier, means connecting the input terminals of said amplifier to said circuit so that electrical pulses transmitted through said circuit by opening and closing of said switching means are amplified, a one-shot multivibrator connected to the output terminals of said amplifier to generate a pulse of predetermined amplitude and time duration for each pulse applied thereto, a rectifier connected to the output of said multivibrator, an integrating circuit connected to the output of said rectifier, and means to measure the output of said integrating circuit which is representative of the frequency of opening and closing of said switching means, said frequency being representative of the rate of fluid flow between said regions when the indicated flow through said first conduit means is zero.

3. Apparatus to measure fluid flow through a passage comprising a structure adapted to be positioned within the passage, packing means extending outwardly from said structure to engage the walls of the passage to divide the passage into first and second regions, first conduit means carried by said structure to communicate between said first and second regions, second conduit means carried by said structure to communicate between said first and second regions, means positioned in said first conduit means to indicate fluid flow through said first conduit means, a rotatable impeller positioned in said second conduit means, means to rotate said impeller at variable speeds, switching means coupled to said impeller so that rotation of said impeller opens and closes said switching means, an electrical circuit including said switching means, a voltage source applied across said circuit, an amplifier, means connecting the input terminals of said amplifier to said circuit so that electrical pulses transmitted through said circuit by opening and closing of said switching means are amplified, a one-shot multivibrator connected to the output terminals of said amplifier to generate a pulse of predetermined amplitude and time duration for each pulse applied thereto, a rectifier connected to the output of said multivibrator, an integrating circuit including a capacitor and a variable resistor connected in parallel relationship across the output terminals of said rectifier, and a voltage measuring circuit including a pair of vacuum tubes each having at least an anode, a cathode and a control grid, the anodes of said tubes being interconnected and the cathodes of said tubes being interconnected through a variable resistance network and a current indicating device, means mechanically connecting said variable resistance network to said variable resistor so that an increase in resistance of said variable resistor increases the resistance in circuit with said current indicating device, said current indicating device providing a signal representative of the frequency of opening and closing of said switching means, said frequency being representative of the rate of fluid flow between said regions when the indicated flow through said first conduit means is zero.

4. Apparatus to measure fluid flow through a passage comprising a structure adapted to be positioned within the passage, packing means extending outwardly from said structure to engage the walls of the passage to divide the passage into first and second regions, first conduit means carried by said structure to communicate between said first and second regions, second conduit means carried by said structure to communicate between said first and second regions, means positioned in said first conduit means to indicate fluid flow through said first conduit means, a rotatable impeller positioned in said second conduit means, means to rotate said impeller at variable speeds, switching means coupled to said impeller so that rotation of said impeller opens and closes said switching means, an electrical circuit including said switching means, a voltage source applied across said circuit, an amplifier, means connecting the input terminals of said amplifier to said circuit so that electrical pulses transmitted through said circuit by opening and closing of said switching means are amplified, and an audio speaker connected to the output terminals of said amplifier, the output of said speaker providing a signal representative of the frequency of opening and closing of said switching means, said frequency being representative of the rate of fluid flow between said regions when the indicated flow through said first conduit means is zero.

5. Apparatus to measure fluid flow through a passage comprising a structure adapted to be positioned within the passage, packing means extending outwardly from said structure to engage the walls of the passage to divide the passage into first and second regions, first conduit means carried by said structure to communicate between said first and second regions, second conduit means carried by said structure to communicate between said first and second regions, a temperature sensitive resistance element positioned in said first conduit means, an electrical bridge network having first and second opposite terminals and including said element in one arm thereof, a voltage source applied across first opposite terminals of said bridge network, current detecting means applied across the second opposite terminals of said bridge network to measure unbalance of said bridge network, said unbalance being representative of fluid flow through said first conduit means, a motor having its drive shaft connected to one other element of said bridge network to vary the impedance thereof to establish an initial balanced condition in said bridge network, a rotatable impeller positioned in said second conduit means, means to rotate said impeller at variable speeds, and means to indicate the speed of rotation of said impeller, said speed being representative of the rate of fluid flow between said regions when the indicated flow through said first conduit means is zero.

6. The combination in accordance with claim 1 wherein said voltage measuring means comprises a pair of vacuum tubes each having at least an anode, a cathode and a control grid, the anodes of said tubes being interconnected and the cathodes of said tubes being interconnected through a current indicating device.

7. The combination in accordance with claim 1 further comprising a frequency divider circuit interposed between said first-mentioned circuit and said pulse generating circuit whereby a preselected fraction of the pulses generated by said switch circuit are applied to the input of said pulse generating circuit.

8. The combination in accordance with claim 2 further comprising a plurality of frequency halving circuits connected in series relationship with the output of said amplifier, and switching means to selectively connect the outputs of said amplifier and each of said frequency halving circuits to the input of said multivibrator.

9. The combination in accordance with claim 8 wherein said first-mentioned switching means comprises a rotatable drum having a sector thereof formed of electrically conductive material, a lead in continuous electrical contact with said sector, positioned adjacent said drum so that electrical contact is completed between said lead and said brush druring a portion of each revolution of said drum when said brush is in contact with said sector.

10. The combination in accordance with claim 3 wherein said means connecting the input terminals of said amplifier to said circuit comprises a frequency divider circuit so that a preselected fraction of the pulses generated by said first-mentioned circuit is applied to the input of said amplifier.

11. The combination in accordance with claim 5 wherein said means to indicate the speed of rotation of said impeller comprises switching means connected to said impeller so that rotation of said impeller opens and closes said switching means, and means to indicate the frequency at which said switching means is opened and closed by rotation of said impeller.

12. The combination in accordance with claim 5 wherein said means to indicate the speed of rotation of said impeller comprises electrical switching means connected to said impeller so that rotation of said impeller opens and closes said switching means, an electrical circuit including said switching means, a voltage source applied across said circuit, and means to count the voltage pulses transmitted through said circuit by the opening and closing of said switching means to determine the frequency at which said switching means is opened and closed by rotation of said impeller.

References Cited in the file of this patent

UNITED STATES PATENTS

| | | |
|---|---|---|
| 1,652,472 | Erwin et al. | Dec. 13, 1927 |
| 1,779,783 | Sylvander et al. | Oct. 28, 1930 |
| 2,334,920 | Gosline et al. | Nov. 23, 1943 |
| 2,519,015 | Bensen | Aug. 15, 1950 |
| 2,524,150 | Vincent | Oct. 3, 1950 |

FOREIGN PATENTS

| | | |
|---|---|---|
| 606,278 | Great Britain | Aug. 11, 1948 |